United States Patent [19]

O'Neil

[11] Patent Number: 4,723,998

[45] Date of Patent: Feb. 9, 1988

[54] RECOVERY OF GOLD FROM CARBONACEOUS ORES BY SIMULTANEOUS CHLORINE LEACH AND ION EXCHANGE RESIN ADSORPTION PROCESS

[76] Inventor: Gregory R. O'Neil, 6333 Tchoupitoulas St., New Orleans, La. 70118

[21] Appl. No.: 802,991

[22] Filed: Nov. 29, 1985

[51] Int. Cl.[4] .................. C22B 11/06; C01G 7/00
[52] U.S. Cl. .................... 75/101 R; 75/2; 75/101 BE; 75/112; 75/114; 75/118 R; 423/24; 423/38; 423/46; 423/DIG. 14; 204/111; 210/684; 210/685
[58] Field of Search ........... 75/101 R, 112, 101 BE, 75/114, 118 R, 2; 423/24, 29, 38, 46, DIG. 1; 204/109, 110, 111; 210/684, 685

[56] References Cited

U.S. PATENT DOCUMENTS

| | | | |
|---|---|---|---|
| 3,656,939 | 4/1972 | Boehm et al. | 75/101 BE |
| 3,764,650 | 10/1973 | Scheiner et al. | 423/38 |
| 3,834,896 | 9/1974 | Eisele et al. | 75/118 R |
| 3,985,552 | 10/1976 | Edwards | 423/24 |
| 4,056,261 | 11/1977 | Darrah | 75/101 R |
| 4,128,462 | 12/1978 | Ghiringhelli et al. | 204/109 |
| 4,131,454 | 12/1978 | Piret et al. | 75/118 R |
| 4,139,432 | 2/1979 | Ghiringhelli et al. | 204/110 |
| 4,289,530 | 9/1981 | Rich | 75/118 R |
| 4,289,532 | 9/1981 | Matson | 423/29 |
| 4,297,134 | 10/1981 | Yamada | 423/24 |
| 4,368,073 | 1/1983 | Breister et al. | 75/118 R |
| 4,389,248 | 6/1983 | Iio et al. | 75/118 R |
| 4,397,689 | 8/1983 | Lea et al. | 75/118 R |
| 4,439,235 | 3/1984 | Simpson | 423/38 |
| 4,551,213 | 11/1985 | Wilson | 75/118 R |

OTHER PUBLICATIONS

Lo, Teh C. et al, *Handbook of Solvent Extraction*, 1983, pp. 725-732.

*Primary Examiner*—Robert L. Stoll
*Attorney, Agent, or Firm*—Fisher, Christen & Sabol

[57] ABSTRACT

A gold recovery process is disclosed in which the gold content of ores, including carbonaceous ores or mixtures of carbonaceous and oxide ores, is extracted by a simultaneous chlorine leach and ion exchange resin adsorption procedure. The process eliminates or reduces the degree of oxygenation and cyanidation required to conduct a standard gold extraction process.

18 Claims, 2 Drawing Figures

RECOVERY OF GOLD FROM CARBONACEOUS ORES BY SIMULTANEOUS CHLORINE LEACH AND ION EXCHANGE RESIN ADSORPTION PROCESS

BACKGROUND OF THE INVENTION

1. Field of the Invention

This invention relates generally to processes for the recovery of gold from gold-containing carbonaceous ores or mixtures of carbonaceous and oxide ores using chlorine leaching techniques. More specifically, this invention relates to the recovery of gold from carbonaceous ores or mixtures of carbonaceous ores and oxide ores in which a simultaneous chlorine leach and adsorption step is used, where the absorbent is a member selected from a group of ion exchange resins that selectively adsorb gold from gold-containing solutions.

2. Prior Art

In the context of this disclosure, oxide ores are gold-containing ores from which gold is easily extracted by conventional cyanidation techniques. "Carbonaceous gold-containing ores" or simply, "carbonaceous ores", denote refractory gold-containing ores which also contain organic carbonaceous matter. Organic carbonaceous matter substantially reduces the effectiveness of lixiviants during the extraction of gold from such ores by conventional cyanidation technology.

Carbonaceous gold-bearing ores are found widely in the United States and in other countries throughout the world. In some instances, carbonaceous ores can be found without the admix of oxide ores, however, the usual case is that carbonaceous ores and oxide ores are found in mixtures. The fraction of carbonaceous ore in the mixtures of carbonaceous and oxide ores can vary. These ore mixtures have the characteristic of not being amenable to standard cyanidation techniques because of their carbonaceous ore content. For example, less than about 50 percent gold extraction is obtainable from such ore mixtures when these ore mixtures are treated by conventional "straight" cyanidation methods. For this reason, it is usually more efficient to process the ore mixtures as if the ore mixtures were composed entirely of carbonaceous ore. Carbonaceous ores are not amenable to standard cyanidation techniques because carbonaceous and other deleterious impurities often associated with carbonaceous ores react with or "tie up" gold cyanide complexes. Typically, a carbonaceous gold bearing ore contains anywhere from 0.05 to 2.0 ounces of gold per ton of ore and has from about 1 to about 8 percent by weight total carbon. The organic carbon content of the ore is usually between about 0.05 and about 3 percent by weight.

Research into methods of recovering gold from carbonaceous gold-containing ores has led to the development of processes utilizing oxidation to render the carbonaceous ores more amenable to subsequent cyanidation steps. Oxidation in these processes is usually accomplished by a first step of oxygenation with air or another oxygen containing gas. A chlorination step when follows using gaseous chlorine to complete the oxidation step. In several of the oxidation processes, chlorination is the major oxidizing step, but oxygenation is used as a "preoxidation" step to reduce the amount of chlorine required in subsequent chlorination steps. Preoxidation can include oxygenation, chlorination, or combinations of these. The oxidation step is then followed by a cyanidation step in standard gold extraction methods.

One process using oxygenation and/or chlorination prior to a cyanidation step is delineated in U.S. Pat. No. 4,289,532 to Matson herein incorporated by reference. The disclosure of the Matson reference is illustrative of the complex processes presently required to recover gold from carbonaceous gold-containing ores. This process requires (1) the wet grinding of the carbonaceous ore, (2) a preoxidation step, (3) a chlorination step, (4) holding steps to eliminate hypochlorite ions, (5) a cyanidation step, and (6) an electrolytic operation to remove the gold from the solution. It is undesirable in certain geographical locations to conduct cyanidation operations because of potential environmental and safety hazards. For this reason and because of the expense of cyanide compounds, the gold extracting industry attempts to reduce or eliminate cyanidation steps in gold extraction methods.

One method for eliminating or reducing the degree of the cyanidation step in a gold extraction method is the extraction of the recoverable gold with only a chlorination step. In this method chlorine is injected into an aqueous ore slurry and converts gold into a soluble gold complex ion. The exact chemical structure of the gold complex ion is not well defined. Such extraction methods are known as chlorine "water leaching" methods and were popular during the 1800's. These methods were discontinuted after the discovery of more efficient cyanide leaching processes.

Several processes exist that were developed to improve the yield and/or the rate of recovery from the reaction of chlorine and gold in a gold recovery method.

U.S. Pat. No. 3,834,896 to Eisele et al. discloses a process whereby gold is recovered from ores by treating the ores at elevated temperatures with gaseous chlorine in the presence of a promoter comprising a compound containing iron, aluminum, or gallium. Activated carbon is then used to adsorb the resulting complex $AuMeCl_6$ where Me is iron, aluminum, or gallium. The fuel expenditures to achieve the elevated temperatures of 200° to 500° C. required by this process make this process economically undesirable.

U.S. Pat. No. 4,131,454 to Piret et al. describes a process whereby gold and silver can be recovered from chloride solutions containing other heavy metals. The chlorinated solutions are subjected to a three step treatment. In the first step, finely divided activated carbon is added for reduction of gold to gold metal and adsorption of the gold metal by the carbon. In the second step, a reducing metal such as zinc dust is added to the solution. In the third step, iodine is used to selectively precipitate the precious metals. Melting is then used to recover a precious metal regulus. This process, because it requires heavy metals to be the main constituent of the recovery solution, has a narrow application and is not generally economical for the recovery of gold from carbonaceous ores.

U.S. Pat. No. 4,056,261 to Darrah discloses a system for recovering gold or silver from "mine run" dumps or crushed ores. The system uses an inclined surface for supporting a heap of the mine run dumps or crushed ores. An alkaline cyanide aqueous solution is distributed onto the heap. A "pregnant" or gold-containing solution results and is collected as a run-off from the inclined surface. Activated carbon loaded ion exchange vessels are used in series to strip the gold or silver from the run-off solution. This process is concerned with a method combining a resin with a cyanide solution and is, therefore, unable to reduce or eliminate the use of cyanide in a gold or other precious metal extraction process.

U.S. Pat. Nos. 4,128,462 and 4,139,432, each to Ghiringhelli et al. disclose processes for recovering precious metals from ores. These processes use cyanide complexing agents in conjunction with electroconductive cationic resins. These disclosures are primarily concerned with increasing the rate of reaction for the electrochemical deposition of precious metals from an ore per unit of time.

U.S. Pat. No. 3,985,552 to Edwards discloses a method for separating gold from palladium in solutions containing chloride complexes of these metals together with other platinum group metals. Base metals can be present in the solution. The method requires contacting of the solution for a sufficient amount of time to result in the extracting of substantially all of the gold or palladium values present within the ore with a water insoluble, non-volatile solvent extractant in an organic phase and having functional groups of the formula $R^1$—S—R wherein $R^1$ and R may be the same or different group and have a carbon atom joined directly to the sulfur atom. This compound is capable of acting as an ion exchanger or complexing group and separates the two phases to recover the extracted gold and palladium. This patent is only concerned with the use of thioethers having the disclosed structure and the separation of the various disclosed precious metals in a chloride complex solution.

U.S. Pat. No. 3,656,939 to Boehm et al. discloses a process for the removal of palladium cations in a cation exchange resin bed from a chloride solution. A reducing agent is added to the chloride solution to precipitate the palladium. This enables the palladium to be selectively obtained at the exclusion of all other metals. The ion exchange resin identified in this patent is narrowly defined and the invention of this patent is not directed to the extraction of precious metals from refractory ores.

The precious metal extracting industry lacks an efficient chlorine leach method to extract gold from carbonaceous ores.

SUMMARY OF THE INVENTION

The invention provides a process for recovering gold from carbonaceous ore utilizing a chlorine leach procedure performed simultaneously with a resin adsorption procedure. The invented process is referred to by the acronym, CRIP, which stands for the phrase, Chlorination-Resin-In-Pulp.

In a CRIP process ground refractory carbonaceous ore is slurried with water. The resulting slurry is then passed to chlorine leach/resin adsorption vessels in which gaseous chlorine or other chlorine compounds are added. The chlorine dissolves the gold deposited in the slurried carbonaceous ore. The dissolved gold adsorbs onto resins flowing, preferably, countercurrent to the ore flow. The gold loaded resin is separated from the gold depleted slurry by a means for screening or separating. The gold can then be stripped from the gold loaded resin. After separation of the gold, the resin can be recycled, back to the chlorine leach/resin adsorption vessels and reused.

The preferred process of this invention to recover gold from carbonaceous ore comprises the following steps. The initial step is the wetting of a gold-containing ore to from an aqueous ore slurry. The slurry is contacted with (1) a chlorine providing compound to solubilize and complex the gold from the ore and (2) an ion exchange resin that is selective toward the solubilized and complexed gold. The ion exchange resin adsorbs solubilized gold from the slurry. Separating of the aqueous ore slurry with a means for removing the gold loaded ion exchange resin then occurs. The gold laden ion exchange resin is then processed by a means for stripping the gold from the resin. It is desirable that the resin then be recycled to the vessels in which chlorination and resin adsorption occur.

An alternative embodiment of this invention includes the use of a preoxygenation step before contacting the ore with chlorine and an ion exchange resin.

Another alternative embodiment of this invention includes a cyanidation extraction step following the contacting of the ore with chlorine and an ion exchange resin.

DETAILED DESCRIPTION OF THE INVENTION

Figure 1:
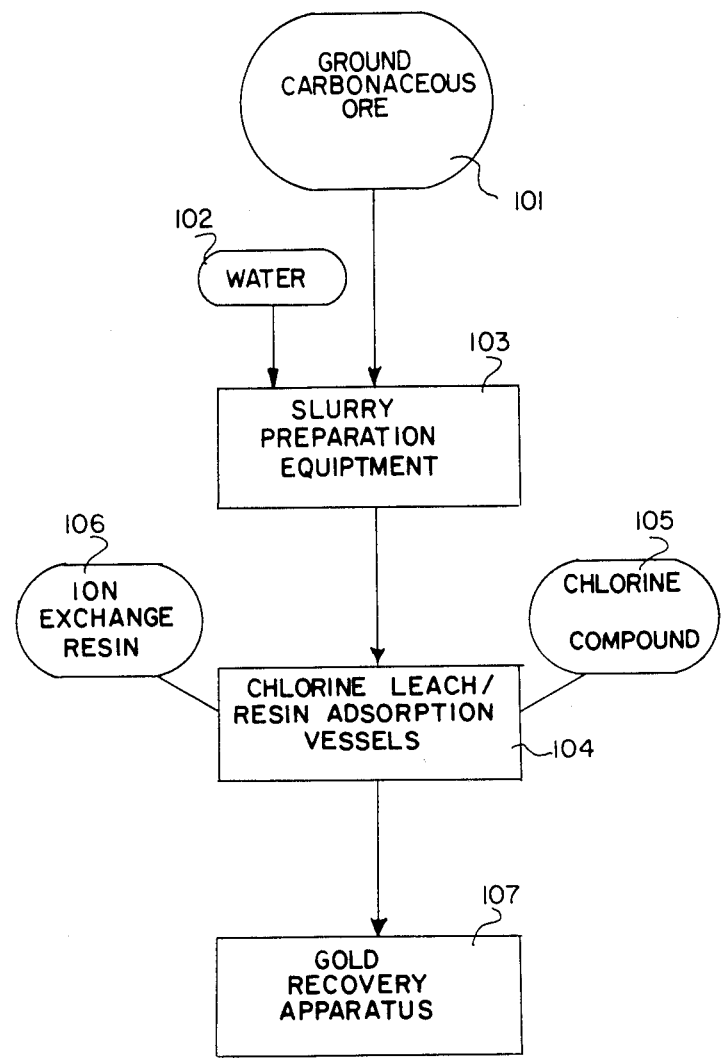
FIG. 1 is a block diagram of the major steps in the CRIP process.

FIG. 1 is a block diagram illustrating the major steps in the CRIP process. Ground carbonaceous ore 101 is slurried with water 102 in slurry preparation equipment 103. The resulting ore slurry is then transferred to a simultaneous chlorine leach and resin adsorption vessel 104. A chlorine providing compound 105 and an ion exchange resin 106 are fed into this vessel. The ion exchange resin adsorbs gold that is dissolved by the chlorine solution. The gold loaded resin then passes to a gold recovery apparatus 107 where the gold is stripped from the ion exchange resin and collected for further refinement.

Figure 2:
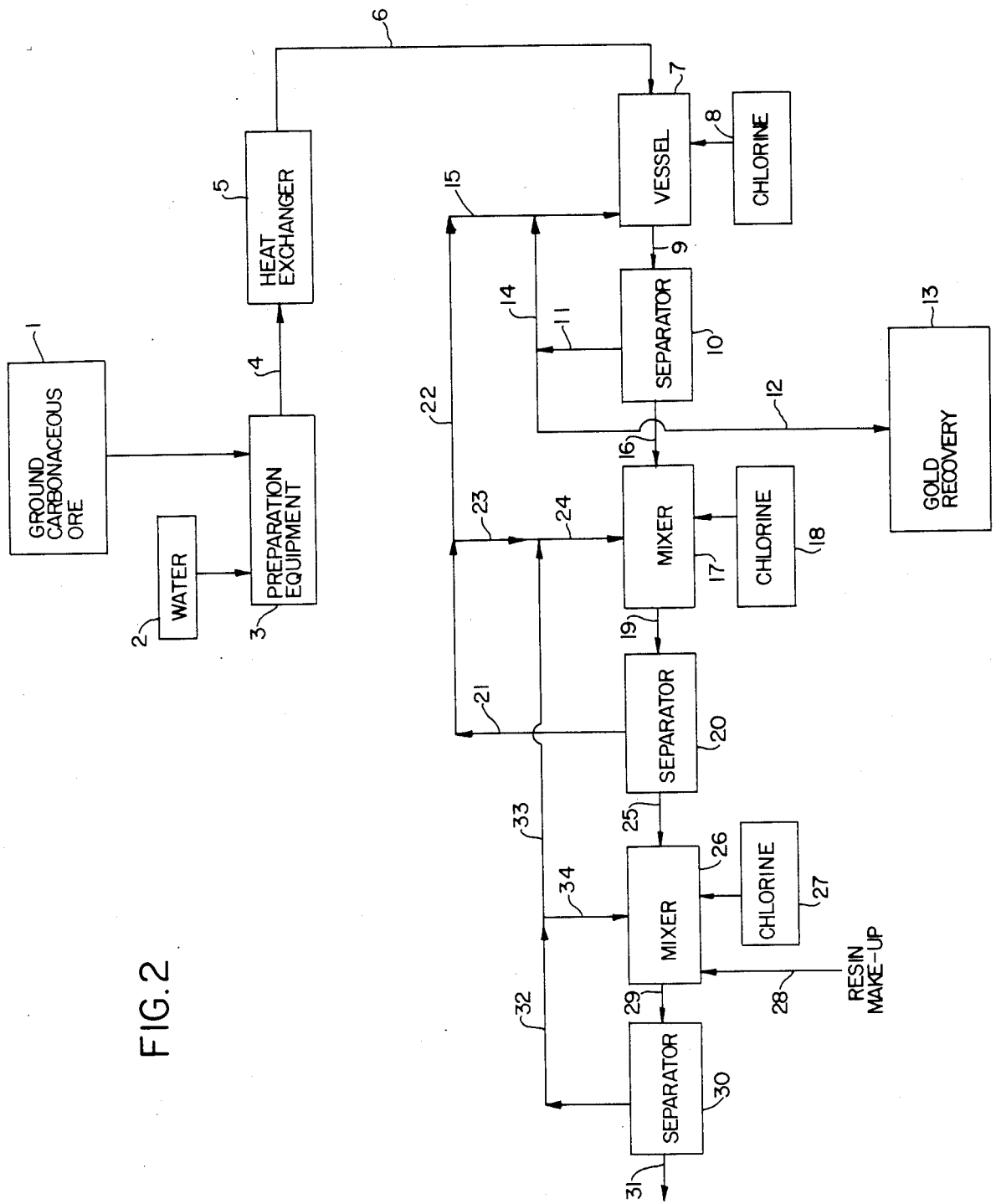
FIG. 2 is a proces flow sheet which provides a detailed illustration of an industrial CRIP process.

FIG. 2 illustrates the CRIP process in more detail. Ground carbonaceous ore 1 is slurried with water 2 in slurry preparation equipment 3 such that the slurry has a solids content of approximately 50 percent by weight. The resulting slurry is transferred via a line 4 to a heat exchanger 5 where the slurry temperature is adjusted to between about 70° F. and about 140° F. Higher temperatures improve the gold recovery efficiency in the CRIP process significantly. The amount of heat input required to achieve the desired temperature can vary considerably and is dependent upon the ambient weather conditions and the amount of exothermic chlorine reactions that occur with a particular slurry.

The slurry is then passed through a line 6 to a vessel for the simultaneous chlorine leaching and resin adsorbing operation. This operation is carried out in a plurality of stages by simultaneously contacting the slurry with a chlorine leach solutions and gold adsorbing resin. The ion exchange resin preferably moves counter-current to the flow of the ore slurry. This simultaneous leaching and adsorption step has three stages in the preferred embodiment. The number of these stages can range from a minimum of two stages to eight or more stages. The use of a plurality of chlorine leaching and resin adsorbing stages enables sufficient contact between the countercurrent flow of ore slurry and resin to permit adsorbtion of the dissolved gold.

The slurry in line 6 enters a first mixing tank or chlorination vessel 7 where the slurry is contacted with a chlorine providing compound 8. The chlorine for this process can be provided by chlorine gas, sodium hypochlorite, potassium hypochlorite, or other compounds or mixtures of compounds. In the preferred embodiment chlorine gas is used. The chlorine providing compound 8, expressed as $Cl_2$, is preferably added to the slurry in amounts of between about 50 and about 300 pounds per ton of dry ore.

Even though chlorine gas is used as the sources of chlorine, the residual chlorine-containing ion in the slurry is in the form of hypochlorite ions ($—OCl^-$). This is true since, at the normally prevailing pH at that point in the process, chlorine gas is rapidly converted to hypochlorite ions as it dissolves.

A resin containing stream 15 is also fed into the chlorination vessel 7. The source of resin containing stream 15 is described below. The resin is added to the chlorination vessel after being slurried with water and screened to remove fines. Between about 30 and about 150 pounds of dry resin per ton of dry ore is added. The mixture of slurry, resin, and hypochlorite ions is agitated in the chlorination vessel 7. The total contact time for the slurry, resin, and hypochlorite ions in the chlorination vessel 7 and the mixing tanks 17 and 26 is between about two hours and about eight hours.

The slurry exits the chlorination vessel 7 through a line 9 and is pumped to a separator 10 which separates the slurry into a resin stream 11 and an ore slurry stream 16. This separation can be accomplished, for example, via a screening operation or other separation operation based on particle size. Such separation of ore particles and resin particles is possible because of the large difference in size. A substantial portion of the resin stream 11, usually about 85 to 95 percent, is diverted as a stream 14 and mixed with the recycle stream or resin return line 22 to make up the resin containing stream 15 described above which is fed to the chlorination vessel 7. A second portion of the resin stream 11, usually about 5 to 15 percent, is removed as a gold loaded resin stream 12. A gold loaded resin stream is called a "pregnant" stream because it contains complexed gold. The gold loaded resin stream 12 is sent to the gold recovery section 13 where the resin is "stripped" of its gold content. Chemical elution, for example, with mixtures of hydrochloric acid and thiourea is one means for stripping gold from the resin. The stripped gold can then be further refined by standard techniques (not shown).

The CRIP process continues as the slurry of the stream 16 passes sequentially through additional leach-adsorption and separation stages as illustrated in FIG. 2 by mixers 17 and 26, separators 20 and 30, chlorine feed sources 18 and 27, ore transfer lines 19, 25, 29 and 31, and resin return lines 21, 22, 23, 24, 32, 33 and 34. Resin is provided from either recycled, stripped resin from the gold recovery plant or unused resin which is added to the process via a stream 28. The gold depleted ore slurry exits the process via a stream 31 and can be further treated for additional gold extraction.

A decision to further treat this slurry requires an economic evaluation which is based upon considerations such as the quantity of gold remaining in the slurry and the additional cost of recovering that gold between the ore particles and the resin particles. Further treatment of this slurry can be accomplished by straight cyanidation methods.

Several resins provide satisfactory results for use as adsorbents in the CRIP process. In the preferred embodiment AMBERLITE ® IRA-400, which is a strong base resin with a quaternary ammonium ion functional group, is selective toward gold in carbonaceous ores. Both strong and weak-base fine resins function well as adsorbents in the chlorine leach step performed according to this invention.

Table I presents suitable resins and their characteristics which are acceptable for use in the CRIP process.

TABLE I

PROPERTIES OF RESINS[1]

| Designation | Manufacturer | Type | Polymer | Functional Group |
|---|---|---|---|---|
| IRA-400 | Rohm & Haas[2] | Strong base | Styrene-DVB | Quaternary Ammonium |
| AFP-329 | Sybron[3] | Weak base | Styrene-DVB | Tertiary Amine |
| A-641 | Sybron | Strong base I | Styrene-DVB | Quaternary Ammonium |
| XAD-8 | Rohm & Haas | Non-ionic | Acrylic ester | None |
| A-540 | Sybron | Strong base | Polystyrene | Quaternary Ammonium |
| ES-466 | Diamond[4] Shamrock | Chelating | Styrene-DVB | Aminodiacetic Groups |
| Dowex SAR | DOW[5] | Strong base II | Styrene-DVB | Quaternary Ammonium |
| XAD-4 | Rohm & Haas | Non-ionic | Polystyrene | None |
| DUOLITE ® A-101D | Rohm & Haas | Strong Base I | Styrene-DVB | Quaternary Ammonium |

Addresses:
[1]The resins are listed in this table in descending order by their relative gold extraction ranking in a chlorination process.
[2]Rohm and Haas Company, Independence Mall West, Philadelphia, PA 19105.
[3]Sybron Corporation, Chemical Division, Birmingham, N.J. 08011.
[4]Duolite International, Inc., A Subsidiary of Diamond Shamrock Corporation, 800 Chestnut Street, Redwood City, CA 94063.
[5]Dow Chemical U.S.A., Functional Products and Systems Department, Midland, MI 48640.

Additional ion exchange resins not listed in Table I can be used with the process of this invention. This invention is not limited to a particular ion exchange resin.

Similar chemical reactions occur in both the chlorination step of U.S. Pat. No. 4,289,532 to Matson and the chlorine leach step of this invention, but notable differences exist between the two methods. In the chlorination step of the Matson patent, the chemical reaction of prime importance is the oxidizing reaction of chlorine with the carbonaceous matter contained in the ore.

In the CRIP process the reaction of prime concern is the solubilization of the gold by chlorine. The oxidizing reactions which occur in the Matson process also occur in the invented process. The resulting oxidation makes the carbonaceous ore more amenable to a cyanidation procedure after chlorine leaching, if a cyanidation procedure is necessary. When a cyanidation step is necessary, removal of a substantial portion of the gold contained by the ore in the chlorine leach step enables the subsequent cyanidation step to increase the overall gold recovered from the ore.

The CRIP process can be combined with existing chlorination and cyanidation facilities to provide those facilities with a choice of a group of systems for recovering gold from refractory carbonaceous ores. The gold from an ore rated as "mildly" or "moderately" refractory can be economically recovered using solely the CRIP process which involves simultaneous chlorine leaching and resin adsorption of gold. A very refractory ore can be initially treated by the CRIP process in conjunction with a cyanidation step to achieve the optimum recovery of gold. Treatment of an extremely refractory ore can be performed by the CRIP process preceded by an oxygenation step and followed by a cyanide leach step. The type of ore to be treated dictates the exact type of recovery system used.

An embodiment of the CRIP process can be used in the recovery of gold from ore bodies in which the ore varies greatly in composition and refractory character. The CRIP process provides a versatile process for conducting such recoveries.

The CRIP process can be used in conjunction with oxygenation and cyanidation procedures as discussed above, but does not require these procedures. The CRIP process can, alone, efficiently recover gold from pure oxide ores, many carbonaceous ores, and mixtures of these. Additionally, the CRIP process works in conjunction with lixiviates other than cyanide.

The following examples illustrate embodiments of the invention for improving gold recoveries using the CRIP process on ores of decreasing refractory or carbonaceous content and increasing oxide content.

EXAMPLE I

The test results of this example are from actual laboratory tests performed on typical gold-containing carbonaceous ore samples. The initial gold content of the ore was 0.245 ounces per ton of ore. The total carbon content of the sample was 6.5 percent by weight and organic carbon content was 0.68 percent. Ores with this carbon composition are considered very refractory to conventional cyanidation.

Each ore sample was prepared for testing by slurrying the ore with tap water to obtain a solids content of about 50 percent by weight. The total weight of the each slurry sample was about 400 grams. The tests were performed in 600 milliliter glass beakers with mild agitation of the slurry samples by T-Line lab stirrers. Eight grams of each adsorbent identified in Table II was added separately to a test beaker. The Teflon ® impellers of the stirrers were rotated at about 100 revolutions per minute. Chlorine leaching of the slurry samples was performed by bubbling gaseous chlorine from pressurized cylinders into the slurry from a location near the bottom of the beakers. Standard laboratory dispersion tubes were used to inject the chlorine gas into the test beakers. The tests were performed at an ambient temperature of about 80° F. The gold content of the leached ore was analyzed after 160 minutes of chlorine leach time and after 240 minutes of chlorine leach time.

Two types of carbon and three types of resin were used as the adsorbents in the tests of this example. The different types of carbon were used for comparative purposes only and were Westates Carbon, Grade CC321 G/S, 6×16 mesh size and 20×48 mesh size, manufactured by the Westates Corporation. The resin or carbon used in each sample is identified in Table II with the results of each test as follows:

TABLE II
RECOVERY OF GOLD WITH CHLORINE LEACH-VERY REFRACTORY CARBONACEOUS ORES

| | 160 Minute Chlorine Leach | | | 240 Minute Chlorine Leach | | |
|---|---|---|---|---|---|---|
| Adsorbent | Residual Au in ore (After leach) oz/ton | % Au Extraction | Total $Cl_2$ used lbs/ton ore | Residual Au in ore (After leach) oz/ton | % Au Extraction | Total $Cl_2$ used lbs/ton ore |
| Resin (IRA-400) | 0.124 | 49 | 65 | 0.086 | 65 | 94 |
| Resin (XAD-8) | 0.141 | 42 | 77 | 0.141 | 42 | 104 |
| Resin (AFP-329) | 0.157 | 36 | 66 | 0.104 | 58 | 100 |
| Carbon* (6 × 16 mesh) | 0.222 | 9 | 62 | 0.189 | 23 | 98 |
| Carbon* (20 × 48 mesh) | 0.216 | 12 | 63 | 0.194 | 21 | 99 |

*These results are provided for comparative purposes.

The variations of chlorine usage shown in Table II are the result of normal measuring variations experienced when adding chlorine or other gases at very low rates to test vessels. The total chlorine usage figures were precisely determined by titration of the test slurries using the Mohr method. The Mohr method is a standard titration test using silver nitrate to determine the concentration of chlorides in a solution.

Example I illustrates a distinct advantage for resins over carbon as gold adsorbents in the chlorine solutions. The example also shows a direct relationship between the length of time of chlorine leaching and the percentage of gold extracted from the ore. This example, wherein gold recoveries occur only by the CRIP process, demonstrates that between about 40 to about 65 percent gold recovery occurs from this refractory ore at the chlorine addition rate of about 100 pounds per ton of ore.

EXAMPLE II

In this example the three chlorine leached test slurries of Example I which employed resin adsorbents were further processed through a standard cyanidation leach procedure.

The resin containing slurries from Example I were screened through a #65 U.S. mesh filter screen to remove the resins. Residual hypochlorite ion concentrations in the test slurries were then consumed by chemical reaction with sodium sulfite, $Na_2SO_3$. This step was performed because hypochlorite reacts with sodium cyanide, NaCN, in the subsequent cyanide leaching step and renders the cyanide ineffective for gold leaching. Next, the pH of the test slurries were adjusted to between about 10 to about 10.5 with the use of lime. This pH adjustment is a standard gold industry practice and holds cyanide vapor pressures at a low level for safety and environmental purposes. Sodium cyanide was then added to each test slurry in an amount equivalent to 2 pounds of sodium cyanide per ton of ore. Westates carbon, 6×16 mesh, was then added to the test slurries in an amount equivalent to about 20 grams per liter of slurry. The test slurries were then transferred to 800 milliliter plastic beakers and placed on bottle type agitator rolls where they were agitated at about 30 revolutions per minute for 24 hours. Following the 24 hour agitation period, the beakers were opened and the carbon was sieved from the test slurry using a #24 U.S.

mesh screen. The slurry was then filtered using a Baroid standard filter press to separate the test slurries into solid ore and liquid fractions. Chemical analysis was then performed on the fractions as desired. The results of the cyanidation steps are in Table III below:

TABLE III

RECOVERY OF GOLD FROM VERY REFRACTORY CARBONACEOUS GOLD CONTAINING ORES - CHLORINE LEACH FOLLOWED BY STANDARD CYANIDE LEACH

| Adsorbent | Chlorine leach-Au Extraction (from Table II) % | Cyanide Leach - Au Extraction % | Total % Extraction chlorine leach & cyanide leach |
|---|---|---|---|
| Resin - (IRA-400) | 65 | 20 | 85 |
| Resin - (XAD-8) | 42 | 38 | 80 |
| Resin - (AFP-329) | 58 | 27 | 85 |

Table III illustrates that a cyanide leach step following a chlorine leach step can remove appreciable gold from a very refractory carbonaceous ore.

EXAMPLE III

The tests of this example were performed using the same procedures as described in Examples I and II. Both a chlorine leach and a cyanide leach were employed to extract gold from the ore of this example. The ore in this example was less refractory than the ore used in Examples I and II. The total carbon content of the ore was 5.3 percent and the organic carbon content was 0.43 percent. This ore is considered moderately refractory. The gold content of the ore was 0.247 ounces per ton.

The results of the tests of this example are shown in Table IV. In this example only the results for a 240 minute chlorine leach are shown. This is because the importance of time to the reaction was demonstrated in the chlorine leach step of Example I.

The percent of gold extractions in the tests of this example for the chlorine leach and cyanide leach steps is higher than those of the preceding examples, but the additional recovery of gold using cyanide leaching remains about the same. This example illustrates the phenomenon that, as the refractory nature of the ore is reduced, gold recovery using the CRIP process increases and the value of the cyanide adjunct is decreased. Moreover, the chlorine requirement is decreased when the CRIP process is used. The higher extractions obtained in this example are a result of the lower refractory nature of the ore.

EXAMPLE IV

This example was a series of laboratory tests performed on the same ore of Examples I and II. Prior to a chlorine leach step, the ore was subjected to an oxygenation step. The oxygenation step if frequently used in existing processes for recovering gold from carbonaceous ores. The oxygenation step serves the useful purpose of reducing chlorine demand in a subsequent chlorination step, while maintaining subsequent leach gold recovery at previously established levels.

In this example the ore was ground such that it passed through a #100 U.S. mesh screen. A 50 percent slurry was then prepared in a 3 liter stainless steel cylindrical test pot using 220 grams of tap water. Fifty-five grams of soda ash were added to the slurry. The addition of an alkaline material for pH adjustment is a standard procedure in oxygenation processes. The slurry was agitated using a T-Line laboratory stirrer with a 3 inch diameter pitch-blade impeller. The impeller rotated at about 700 revolutions per minute. The slurry temperature was maintained at 180° F. to 182° F. during the test. Oxygenation was provided by injecting air through one-quarter inch stainless steel tubing into the slurry at a location near the bottom of the test pot. The oxygenation was continued for 8 hours. The total air injected was equivalent to 5000 cubic feet per ton of ore. After this period individual 400 gram slurry samples were removed from the test pot and the individual test samples were processed through the identical chlorine leach and cyanide leach procedures described in Examples I and II. The results of the tests of this example are shown in Table V. As in Example III, the chlorine leach test data at the 160 minute point is not shown in this Table.

TABLE IV

RECOVERY OF GOLD FROM MODERATELY REFRACTORY CARBONACEOUS GOLD-CONTAINING ORES - CHLORINE LEACH FOLLOWED BY STANDARD CYANIDE LEACH

| | Chlorine Leach (240 minute) | | | | |
|---|---|---|---|---|---|
| Adsorbent | Residual Au in ore (After Leach) oz/ton | % Au Extracted | Total $Cl_2$ used lbs/ton ore | Cyanide Leach % Au Extracted | Chlorine & Cyanide Leach % Au Extracted |
| Resin - (IRA-400) | 0.063 | 74 | 88 | 18 | 92 |
| Resin - (XAD-8) | 0.105 | 57 | 70 | 32 | 89 |
| Resin - (AFP-329) | 0.074 | 70 | 91 | 17 | 87 |

TABLE V

RECOVERY OF GOLD FROM VERY REFRACTORY CARBONACEOUS GOLD-CONTAINING ORES - CHLORINE LEACH USED IN CONJUNCTION WITH OXYGENATION AND CYANIDE LEACH

| | Chlorine Leach (240 minute) | | | | |
|---|---|---|---|---|---|
| Absorbent | Residual Au in ore (After Leach) ox/ton | % Au Extracted | Total $Cl_2$ used lbs/ton ore | Cyanide Leach % Au Extracted | Chlorine & Cyanide Leach % Au Extracted |
| Resin - (IRA-400) | 0.047 | 81 | 100 | 13 | 94 |
| Resin - (XAD-8) | 0.099 | 60 | 92 | 29 | 89 |
| Resin - | 0.111 | 55 | 84 | 25 | 80 |

TABLE V-continued
RECOVERY OF GOLD FROM VERY REFRACTORY CARBONACEOUS GOLD-CONTAINING ORES - CHLORINE LEACH USED IN CONJUNCTION WITH OXYGENATION AND CYANIDE LEACH

| | Chlorine Leach (240 minute) | | | | |
|---|---|---|---|---|---|
| Absorbent | Residual Au in ore (After Leach) ox/ton | % Au Extracted | Total Cl$_2$ used lbs/ton ore | Cyanide Leach % Au Extracted | Chlorine & Cyanide Leach % Au Extracted |
| (AFP-329) | | | | | |

To determine the advantage achieved from the use of an oxygenation step, the test results of Table V were compared to the test results of Table III. The before-mentioned variations in chlorine usage in the chlorine leach step make a direct comparison difficult. However, it can be seen that the process using oxygenation (Table V) yielded a similar or higher percent gold extraction than did the CRIP process not utilizing oxygenation (Table III). This was true even though average chlorine usage in the process using oxygenation was substantially lower (i.e., 88 pounds of chlorine per ton ore compared to 99 pounds of chlorine per ton ore) than in the process not using oxygenation. The ore used in this example is so refractory that with the chlorine levels used, a cyanide leach is mandatory to give a total gold recovery above 80 percent.

tory ores can be leached by increasing the amount of chlorine used. The current invention provides an ability to "tailor" or balance the application of the CRIP process with cyanide leach methods of the prior art.

EXAMPLE VI

The tests of this example were performed to determine the effect of temperature on chlorine leach efficiency. The procedure for the tests conducted at each temperature was the same as that used in Example III. The ore used was also the same as that used in Example III. Temperatures below ambient were obtained by use of ice cubes in a constant temperature bath. Subsequent cyanide leach tests were conducted at ambient temperature (80° F.). Results of the tests of this example are shown in Table VII, following.

TABLE VIII
RECOVERY OF GOLD FROM MODERATELY REFRACTORY CARBONACEOUS GOLD-CONTAINING ORES AT DIFFERENT CHLORINE LEACH TEMPERATURES. CHLORINE LEACH FOLLOWED BY STANDARD CYANIDE LEACH.

| | | Chlorine Leach (240 Min) | | | Chlorine & |
|---|---|---|---|---|---|
| Adsorbent | Temp. °F. | Residual Au in Ore oz/ton | % Au Extracted | Total Cl$_2$ Used lbs/ton ore | Cyanide Leach % Au Extracted | Cyanide Leach % Au Extracted |
| Resin | 60 | 0.110 | 55 | 81 | 40 | 95 |
| (IRA-400) | 80 | 0.069 | 72 | 54 | 18 | 90 |
| | 140 | 0.026 | 89 | 64 | 4 | 93 |

EXAMPLE V

The same very refractory ore used in Example I was again used in this example. Chlorination rates were greatly increased in this example to improve gold recovery.

The ore was slurried with tap water to obtain a solids content of about 50 percent by weight. Two slurry samples of 600 grams each were prepared. Chlorination was performed with the same equipment described in Example I. Eight grams of the resin, IRA 400, was added to each sample to act as the gold adsorbent. Sample I was chlorinated at an average rate of 24.8 milliliters per minute of chlorine gas for a total of 6 hours. Sample II was chlorinated at an average rate of 30.5 milliliters per minute of chlorine gas for a total of 6 hours. This is equivalent to a total chlorine usage of 190 pounds per ton of ore (Sample I) and 230 pounds per ton of ore (Sample II). Slurry samples were taken and analyzed for gold content at the end of the 6 hour test.

The results of the tests are shown in Table VI.

TABLE VI
RECOVERY OF GOLD FROM VERY REFRACTORY CARBONACEOUS GOLD-CONTAINING ORES - CHLORINE LEACH USING VERY HIGH CHLORINE RATES

| | Chlorine Level | |
|---|---|---|
| | 190 #/T | 230 #/T |
| % Au Extraction | 72 | 88 |

This example illustrates the flexibility of the chlorine leach system. Generally, all ores including very refrac- As explained in Example I, the variations of chlorine usage shown in Table VII are the result of normal measuring variations experienced when adding chlorine or other gas at very low rates to test vessels.

This example illustrates the very significant effect of temperature on the gold recovery efficiency of the chlorine leach step. The increased temperature, however, has little or no effect on the "overall" gold recovery efficiency when a chlorine leach procedure is followed by a cyanide leach procedure.

I claim:

1. A process to recover gold, comprising:
    (a) wetting a gold-containing ore to form an aqueous ore slurry;
    (b) contacting said aqueous ore slurry simultaneously with
        (i) a chlorine providing compound, said chlorine providing compound being a member selected from the group consisting of chlorine gas, sodium hypochlorite, potassium hypochlorite, and mixtures of these, whereby chlorine complexes and solubilizes said gold from said ore and
        (ii) an ion exchange resin, said ion exchange resin being selective toward said complexed, solubilized gold and adsorbs said complexed, solubilized gold from said aqueous ore slurry, said resin being a member selected from the group consisting of (a) styrene-DVB copolymers having a base pH and a quaternary ammonium functional group, (b) styrene-DVB copolymers having a base pH and a tertiary amine functional group, (c) non-ionic acrylic ester polymers, (d) polystyrene polymers having a base pH and a quaternary ammonium functional group, (e) chelating styrene-DVB copolymers having an aminodiacetic functional group, (f) non-ionic polystyrene polymers and (g) mixtures of these;

(c) separating said adsorbed gold from said aqueous ore slurry with a means for removing said gold loaded ion exchange resin; and (d) processing said gold loaded ion exchange resin by a means for stripping said gold from said resin.

2. The process according to claim 1, wherein said ion exchange resin is a strong base resin with a quaternary ammonium ion functional group.

3. The process according to claim 1, wherein said aqueous ore slurry is heated to between about 70° F. and 140° F. before contacting with said chlorine providing compound and said ion exchange resin.

4. The process according to claim 1, wherein said contacting of said aqueous ore slurry with said chlorine providing a compound is at a concentration of between about 50 and 300 pounds expressed as $Cl_2$ per ton of dry ore.

5. The process according to claim 1, wherein said contacting of said aqueous ore slurry with said ion exchange resin is countercurrent with a flow of said aqueous ore slurry.

6. A process to recover gold, comprising:
(a) wetting a gold-containing carbonaceous ore to form an aqueous ore slurry;
(b) oxidizing said aqueous ore slurry with an oxidizing compound;
(c) contacting said aqueous ore slurry simultaneously with
 (i) a chlorine providing compound, said chlorine providing compound being a member selected from the group consisting of chlorine gas, sodium hypochlorite, potassium hypochlorite, and mixtures of these, whereby chlorine complexes and solubilizes said gold from said ore and
 (ii) an ion exchange resin, said ion exchange resin being selective toward said complexed, solubilized gold and adsorbs said complexed, solubilized gold from said aqueous ore slurry, said resin being a member selected from the group consisting of (a) styrene-DVB copolymers having a base pH and a quaternary ammonium functional group, (b) styrene-DVB copolymers having a base pH and a tertiary amine functional group, (c) non-ionic acrylic ester polymers, (d) polystyrene polymers having a base pH and a quaternary ammonium functional group, (e) chelating styrene-DVB copolymers having an aminodiacetic functional group, (f) non-ionic polystyrene polymers and (g) mixtures of these;

(d) separating said adsorbed gold from said aqueous ore slurry with a means for removing said gold loaded ion exchange resin; and (e) processing said gold loaded ion exchange resin by a means for stripping said gold from said resin.

7. The process according to claim 6, wherein said ion exchange resin is a strong base resin with a quaternary ammonium ion functional group.

8. The process according to claim 6, wherein said aqueous ore slurry is heated to between about 70° F. and 140° F. before contacting with said chlorine providing compound and said ion exchange resin.

9. The process according to claim 6, wherein said contacting of said aqueous ore slurry with said chlorine providing compound is at a concentration of between about 50 and 300 pounds expressed as $Cl_2$ per ton of dry ore.

10. The process according to claim 6, wherein said contacting of said aqueous ore slurry with said ion exchange resin is countercurrent with a flow of said aqueous ore slurry.

11. A process to recover gold, comprising:
(a) wetting a gold-containing carbonaceous ore to form an aqueous ore slurry;
(b) oxidizing said aqueous ore slurry with an oxidizing compound;
(c) contacting said aqueous ore slurry simultaneously with
 (i) a chlorine providing compound to complex and solubilize said gold from said ore, said chlorine providing compound being a member selected from the group consisting of chlorine gas, sodium hypochlorite, potassium hypochlorite, and mixtures of these, and
 (ii) an ion exchange resin, said ion exchange resin being selective toward said complexed, solubilized gold and adsorbs said complexed, solubilized gold from said aqueous ore slurry, said resin being a member selected from the group consisting of (a) styrene-DVB copolymers having a base pH and a quaternary ammonium functional group, (b) styrene-DVB copolymers having a base pH and a tertiary amine functional group, (c) non-ionic acrylic ester polymers, (d) polystyrene polymers having a base pH and a quaternary ammonium functional group, (e) chelating styrene-DVB copolymers having an aminodiacetic functional group, (f) non-ionic polystyrene polymers and (g) mixtures of these;

(d) holding said chlorinated aqueous ore slurry to eliminate hypochlorite ions, said hypochlorite ions being a product of said chlorine providing compound;

(e) reacting said hypochlorite-free aqueous ore slurry with a cyanide compound to further leach said gold from said ore;

(f) separating said absorbed gold from said aqueous ore slurry with a means for removing said gold loaded ion exchange resin; and (g) processing said gold loaded ion exchange resin by a means for stripping said gold from said resin.

12. The process according to claim 11, wherein said ion exchange resin is a strong base resin with a quaternary ammoniun ion functional group.

13. The process according to claim 11, wherein said aqueous ore slurry is heated to between about 70° F. and 140° F. before contacting with said chlorine providing compound and said ion exchange resin.

14. The process according to claim 11, wherein said contacting of said aqueous ore slurry with said chlorine providing compound is at a concentration of between about 50 and 300 pounds expressed as $Cl_2$ per ton of dry ore.

15. The process according to claim 11, wherein said contacting of said aqueous ore slurry with said ion exchange resin is countercurrent with a flow of said aqueous ore slurry.

16. The process according to claim 1, wherein said ion exchange resin is a member selected from the group consisting a resin listed in Table I and mixtures of these.

17. The process according to claim 6, wherein said ion exchange resin is a member selected from the group consisting a resin listed in Table I and mixtures of these.

18. The process according to claim 11, wherein said ion exchange resin is a member selected from the group consisting a resin listed in Table I and mixtures of these.

* * * * *

UNITED STATES PATENT AND TRADEMARK OFFICE
CERTIFICATE OF CORRECTION

PATENT NO. : 4,723,998

DATED : February 9, 1988

INVENTOR(S) : Gregory R. O'Neil

It is certified that error appears in the above-identified patent and that said Letters Patent is hereby corrected as shown below:

```
        ON THE TITLE PAGE INSERT,
 --  Assignee:  FREEPORT MINERALS COMPANY
                New Orleans, Louisiana      --.
```

Signed and Sealed this

Thirtieth Day of August, 1988

Attest:

DONALD J. QUIGG

Attesting Officer

Commissioner of Patents and Trademarks